Patented Aug. 16, 1938

2,127,377

UNITED STATES PATENT OFFICE 2,127,377

PREPARATION OF POLYNUCLEAR HYDRO-AROMATIC AMINES

Caryl Sly, Wilmington, Del., assignor to E. I. du Pont de Nemours & Company, Wilmington, Del., a corporation of Delaware No Drawing. Application December 5, 1936, Serial No. 114,368

20 Claims. (Cl. 260—563)

This invention relates to liquid phase catalytic hydrogenation and more particularly to the hydrogenation of beta naphthylamines to decahydro-beta-naphthylamines and didecahydro-beta-naphthylamines.

The catalytic hydrogenation of naphthylamines to the tetrahydro stage (British Patents 276,571 and 290,175 (1927); U. S. Patent 1,919,592, division of U. S. Patent 1,782,729 (1928); Adkins and Cramer J. A. C. S. 52, 4349 (1930)) is well known. These processes employ pressures of 30 to 220 atmospheres and temperatures of 150° to 175° C. or simply elevated temperatures and pressure and use as catalysts nickel, cobalt, copper or mixtures of these metals or oxides.

Hückel and his coworkers have prepared both the alpha- and beta-decahydro-naphthylamines by hydrogenating the oxime of the corresponding decalone (decahydro-naphthanone) or the nitro decahydronaphthalenes with platinum; Ann. 441, 1-48 (1925); 502, 114-136 (1933). This method, however, does not involve the hydrogenation of the naphthalene rings since the starting material was a decalin derivative.

This invention has as its object the preparation of decahydro-beta-naphthylamines by the hydrogenation of beta naphthylamines. Another object is the preparation of decahydro-beta-naphthylamines by the hydrogenation of tetrahydro-beta-naphthylamines. Other objects will appear hereinafter.

The above objects are accomplished by hydrogenating beta-naphthylamines or tetrahydro-beta-naphthylamines with or without an inert solvent in the liquid phase, using a hydrogenating catalyst such as nickel, under superatmospheric pressures and at a temperature of at least 150° C.

The following examples are given for the purpose of illustrating this invention. They are not to be considered as limitations of the invention since many modifications may be made without departing from the spirit and scope thereof.

Example I

Into a small autoclave were charged 150 grams of beta-naphthylamine and 15 grams of a nickel chromite catalyst. While shaking, the contents were heated to 175° to 225° C. under a hydrogen pressure of 1000 to 2000 pounds per square inch. Hydrogen absorption was rapid for a period of 15 to 30 minutes and then ceased. The temperature was then raised to 270° C. and the hydrogen pressure to 2000 to 3000 pounds per square inch under which conditions hydrogen absorption again started and went to completion in a period of 1 to 4 hours. This second period of hydrogen absorption represented the transition from the tetrahydro derivative to the decahydro derivative. The product was discharged from the autoclave, filtered to remove catalyst and distilled at reduced pressure. There was obtained 11 grams of decahydronaphthalene, 52 grams of decahydro-beta-naphthylamine, B. P. 111° C. to 117° C. at 25 mm., and 50 grams of didecahydro-beta-naphthylamine, B. P. 200° C. to 205° C. at 4 mm.

Example II

One hundred fifty (150) grams of beta naphthylamine and 15 grams of a nickel catalyst were charged into a small autoclave and treated as in the preceding example. Distillation of the product gave 32 grams of decahydro-beta-naphthylamine and 78 grams of didecahydro-beta-naphthylamine.

Example III

A small pressure autoclave containing 150 grams of ac-tetrahydro beta naphthylamine and 15 grams of a nickel chromite catalyst were slowly heated to 200° C. under 1500 pounds per square inch hydrogen pressure while shaking. The hydrogen pressure was then increased to 3000 pounds per square inch and the heating continued. At 250° to 270° C. hydrogen absorption started and was complete in 2 hours at a maximum temperature of 300° C. The product on distillation was found to contain 20 grams of decahydro naphthalene, 44 grams of decahydro-beta-naphthylamine, and 58 grams of didecahydro-beta-naphthylamine.

Example IV

Into a small autoclave was charged 150 grams of beta-naphthylamine and 15 grams of a nickel chromite catalyst, and the contents heated to 270° C., under a hydrogen pressure of 2000 to 3000 lbs. per sq. in.; hydrogen absorption was rapid for a few minutes, followed by a slow absorption until completion. The product was discharged from the autoclave, filtered to remove catalyst, and distilled at reduced pressure. There was obtained 11 grams of decahydronaphthalene, 52 grams of decahydro-beta-naphthylamine (boiling point 111° C. to 117° C. at 25 mm.), and 50 grams of di-decahydro-beta-naphthylamine (boiling point 200° C. to 205° C. at 4 mm. pressure).

Certain conditions of temperature and pressure are indicated in the above examples which may be varied within the scope of the invention.

The temperature should be in excess of 250° C. and the hydrogen pressure in excess of 20 atmospheres and especially from 20 to 300 atmospheres. The preferred temperature would be approximately 275° C. and the preferred pressure 170 atmospheres. Hydrogenation to the decahydro stage did not occur below 250° C. with a nickel catalyst, and above 300° C. hydrocarbon and didecahydro-beta-naphthylamine would predominate. The temperature limits will of course vary somewhat with the catalyst used. When platinum is used in place of nickel, the reaction will undoubtedly occur at a lower temperature.

The conditions, particularly the temperature at which hydrogenation will occur is determined at least in part by the catalyst used. Generally, the more active the catalyst the lower the temperature; thus, with platinum and other noble metal hydrogenating catalysts it is possible to hydrogenate at a lower temperature than is possible with nickel and other base metal hydrogenating catalysts. The higher cost of platinum catalysts, however, offsets any practical advantages that may be attained through its higher activity.

As indicated, the starting material may be either beta-naphthylamine or the partially hydrogenated product tetrahydro beta naphthylamine. The N-substituted (alkyl, aryl, etc.) beta-naphthylamines are generally more stable at high temperatures as compared with the free amine and should be particularly adaptable to this process.

The hydrogenation may be carried out either with or without a solvent. While I did not add a solvent to the reaction mixture there was some present due to the formation of decahydronaphthalene in the first step of the reaction. The solvent should be inert toward the naphthylamine and stable under the conditions of temperature and pressure. The preferred solvent would be a saturated cyclic hydrocarbon such as cyclohexane and decahydronaphthalene.

As indicated in the examples it is preferable to use a nickel catalyst either massive or supported. Other base metal hydrogenation catalysts such as cobalt, copper, or their chromites may be used because, despite their lower activity as compared with nickel, they produce fewer secondary reactions. Thus the nickel chromite catalyst gave more mono-decahydro and less didecahydro-beta-naphthylamine as compared with the nickel catalyst. The amount of catalyst may vary from 2% to 10%, depending on its activity and other variables such as pressure and degree of agitation.

This invention provides a simple and cheap method for the preparation of decahydro beta-naphthylamines. Existing methods require either the oxidation of decahydronaphthalene to decalone, formation of the oxime and hydrogenation of the oxime with platinum, or hydrogenation of the naphthol to decalol, dehydrogenation to the decalone and then preparation and hydrogenation of the oxime.

It is apparent that many widely different embodiments of this invention may be made without departing from the spirit and scope thereof and therefore it is not intended to be limited except as indicated in the appended claims.

I claim:

1. A process for the production of a decahydro-beta-naphthylamine which comprises catalytically hydrogenating in the liquid phase beta-naphthylamine to tetrahydro-beta-naphthylamine and then subjecting the resulting product to a temperature in excess of 250° C. but below 300° C. under a superatmospheric pressure in excess of 20 atmospheres whereby the tetrahydro-beta-naphthylamine is hydrogenated to a decahydro-beta-naphthylamine.

2. In a process for the production of a decahydro-beta-naphthylamine, the step which comprises catalytically hydrogenating in the liquid phase tetrahydro-beta-naphthylamine to decahydro-beta-naphthylamine at a temperature in excess of 250° C. but below 300° C. and under a superatmospheric pressure in excess of 20 atmospheres.

3. A process for the production of a decahydro-beta-naphthylamine which comprises catalytically hydrogenating in the liquid phase a beta-naphthylamine under a superatmospheric pressure in excess of 20 atmospheres, while increasing the temperature to between 250° and 300° C.

4. The process for the production of a decahydro-beta-naphthylamine which comprises catalytically hydrogenating in the liquid phase a beta-naphthylamine under a superatmospheric pressure in excess of 20 atmospheres and at a temperature between 250° and 300° C.

5. A process for the production of a decahydro-beta-naphthylamine which comprises bringing a mixture of a liquid beta-naphthylamine and hydrogen in contact with a nickel-containing catalyst at a temperature between 150° C. and 250° C. and a pressure in excess of 20 atmospheres sufficient to cause the hydrogenation of the beta-naphthylamine to a tetrahydro-beta-naphthylamine, then adjusting the temperature to one in excess of 250° C. but below 300° C., thereby causing the tetrahydro-beta-naphthylamine to hydrogenate to a decahydro-beta-naphthylamine.

6. In a process for the production of a decahydro-beta-naphthylamine, the step which comprises bringing a mixture of a liquid tetrahydro-beta-naphthylamine and hydrogen in contact with a nickel-containing catalyst at a temperature in excess of 250° C. but below 300° C. and under a superatmospheric pressure in excess of 20 atmospheres.

7. The process for the production of a decahydro-beta-naphthylamine which comprises bringing a mixture of a liquid beta-naphthylamine and hydrogen in contact with a nickel-containing catalyst under a superatmospheric pressure in excess of 20 atmospheres, while increasing the temperature to between 250° C. and 300° C.

8. A process for the production of a decahydro-beta-naphthylamine which comprises bringing a mixture of a liquid beta-naphthylamine and hydrogen in contact with a nickel-containing catalyst under a superatmospheric pressure in excess of 20 atmospheres and at a temperature between 250° C. and 300° C.

9. The process in accordance with claim 5 characterized in that the hydrogenation of the tetrahydro-beta-naphthylamine is carried out at a temperature of about 250° C. and at a pressure in excess of 20 atmospheres.

10. The process in accordance with claim 6 characterized in that the reaction is carried out at a temperature of about 250° C. and at a pressure in excess of 20 atmospheres.

11. The process in accordance with claim 5 characterized in that the catalyst is metallic nickel.

12. The process in accordance with claim 6 characterized in that the catalyst is metallic nickel.

13. The process in accordance with claim 7 characterized in that the catalyst is metallic nickel.

14. The process in accordance with claim 8 characterized in that the catalyst is metallic nickel.

15. The process in accordance with claim 5 characterized in that the catalyst is a nickel chromite catalyst.

16. The process in accordance with claim 6 characterized in that the catalyst is a nickel chromite catalyst.

17. The process in accordance with claim 7 characterized in that the catalyst is a nickel chromite catalyst.

18. The process in accordance with claim 8 characterized in that the catalyst is a nickel chromite catalyst.

19. A process for the production of decahydro-beta-naphthylamine which comprises bringing liquid beta-naphthylamine and hydrogen in contact with a nickel catalyst at a temperature of about 175° C. to about 225° C. and at a pressure of about 1000 pounds to about 2000 pounds per square inch until hydrogen absorption has ceased, then increasing the temperature to within the range of about 250° to about 300° C. and increasing the pressure to within the range of about 2000 to about 3000 pounds per square inch whereby the hydrogen absorption is again started and maintained under said conditions until it again ceases.

20. The process in accordance with claim 19 characterized in that the reaction is carried out in the presence of an inert solvent.

CARYL SLY.